(12) United States Patent  
Ashcraft et al.

(10) Patent No.: US 8,964,382 B2  
(45) Date of Patent: Feb. 24, 2015

(54) COMPUTING DEVICE WITH SUPPORT MEMBER

(71) Applicant: Hewlett-Packard Development Company, L.P., Houston, TX (US)

(72) Inventors: Britt C. Ashcraft, Torrance, CA (US); Michael Delpier, Houston, TX (US); Dustin L. Hoffman, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 169 days.

(21) Appl. No.: 13/690,512

(22) Filed: Nov. 30, 2012

(65) Prior Publication Data

US 2014/0153176 A1    Jun. 5, 2014

(51) Int. Cl.
*H05K 5/00*    (2006.01)
*H05K 7/00*    (2006.01)
*G06F 1/16*    (2006.01)

(52) U.S. Cl.
CPC ............ *G06F 1/1601* (2013.01); *G06F 1/1613* (2013.01)
USPC ................................ 361/679.59; 361/679.56

(58) Field of Classification Search
USPC .............. 361/679.21, 679.26, 679.3, 679.55, 361/679.56, 679.59; 248/917, 918, 919; 455/575.1–575.9
See application file for complete search history.

(56) References Cited

U.S. PATENT DOCUMENTS

| | | | |
|---|---|---|---|
| 5,751,547 A | 5/1998 | Honda et al. | |
| 6,525,932 B1* | 2/2003 | Ohnishi et al. | 361/679.41 |
| 7,301,759 B2* | 11/2007 | Hsiung | 361/679.27 |
| 8,649,166 B2* | 2/2014 | Wu et al. | 361/679.27 |
| 2009/0009667 A1* | 1/2009 | Dayan | 348/838 |
| 2010/0220441 A1* | 9/2010 | Berlekamp | 361/679.54 |
| 2011/0204843 A1 | 8/2011 | Foster | |
| 2011/0297566 A1 | 12/2011 | Gallagher et al. | |
| 2012/0063068 A1 | 3/2012 | Li | |

FOREIGN PATENT DOCUMENTS

ES    2332764    2/2010

OTHER PUBLICATIONS

Cheng, C., Evolve's Maestro Win7 Slate: Hands On, (Web Page), Jun. 1, 2011.

* cited by examiner

*Primary Examiner* — Anthony Haughton
(74) *Attorney, Agent, or Firm* — Hewlett-Packard Patent Department

(57) ABSTRACT

Embodiments provide methods, apparatuses, and systems for which include support members having a port disposed thereon. The port may be accessible while the support member is an extended position. The port may be inaccessible or isolated while the support member is a stowed position.

20 Claims, 5 Drawing Sheets

COMPUTING DEVICE WITH SUPPORT MEMBER

BACKGROUND

Computing devices such as, but not limited to, slate computers, tablet computers, mobile phones, smart phones, notebook computers, and desktop computers generally include displays. The displays of the computing devices are often utilized by consumers as a means of displaying and interacting with data. This interaction is often facilitated when the display is supported in an elevated and generally vertical position, i.e., the surface of the display is in a plane perpendicular to a line of sight of the user. While the display may provide visual indications of data, peripheral devices may enable the consumer to virtually interact with data. Peripheral devices may interface with the computing devices via one or more ports and/or components.

DETAILED DESCRIPTION

Computing devices such as tablet computers, slate computers, mobile phones, smart phones, notebook computers, desktop computers, and others include displays which may be utilized in a variety of positions. For example, a tablet computer may be placed on a horizontal surface with a display facing up. Alternatively, the tablet computer may be held by a user such that the display is substantially vertical, or positioned at an angle other than horizontal. These various angles may facilitate interaction by a user. Interaction by a user may include peripheral devices such as keyboards, mice, and touchpads, or touchscreens. As the devices become smaller and more portable to accommodate travel and use by consumers, areas for ports to facilitate use of various peripheral devices become more competitive and lease feasible. This leads to a restricted selection of possible ports and may lead to various housings and computing devices becoming outdated or useless in the ever-changing technological world.

In the present disclosure, a computing device is disclosed with a support member capable of supporting the computing device in a plurality of positions. The support member may be extended to support the computing device in plurality of substantially vertical positions. In addition, the support member while extended, may enable access to one or more ports. The one or more ports may enable coupling of various devices to the computing device. While in a closed position, the support member may be moved into a recess of the computing device such that the computing device appears to have a substantially solid housing. This may increase aesthetics of the computing device. In addition, while in the retracted state, the one or more ports on the support member may be enclosed within the housing thereby preventing entry of contaminants such as dust, debris, and water, among others.

Figure 1:
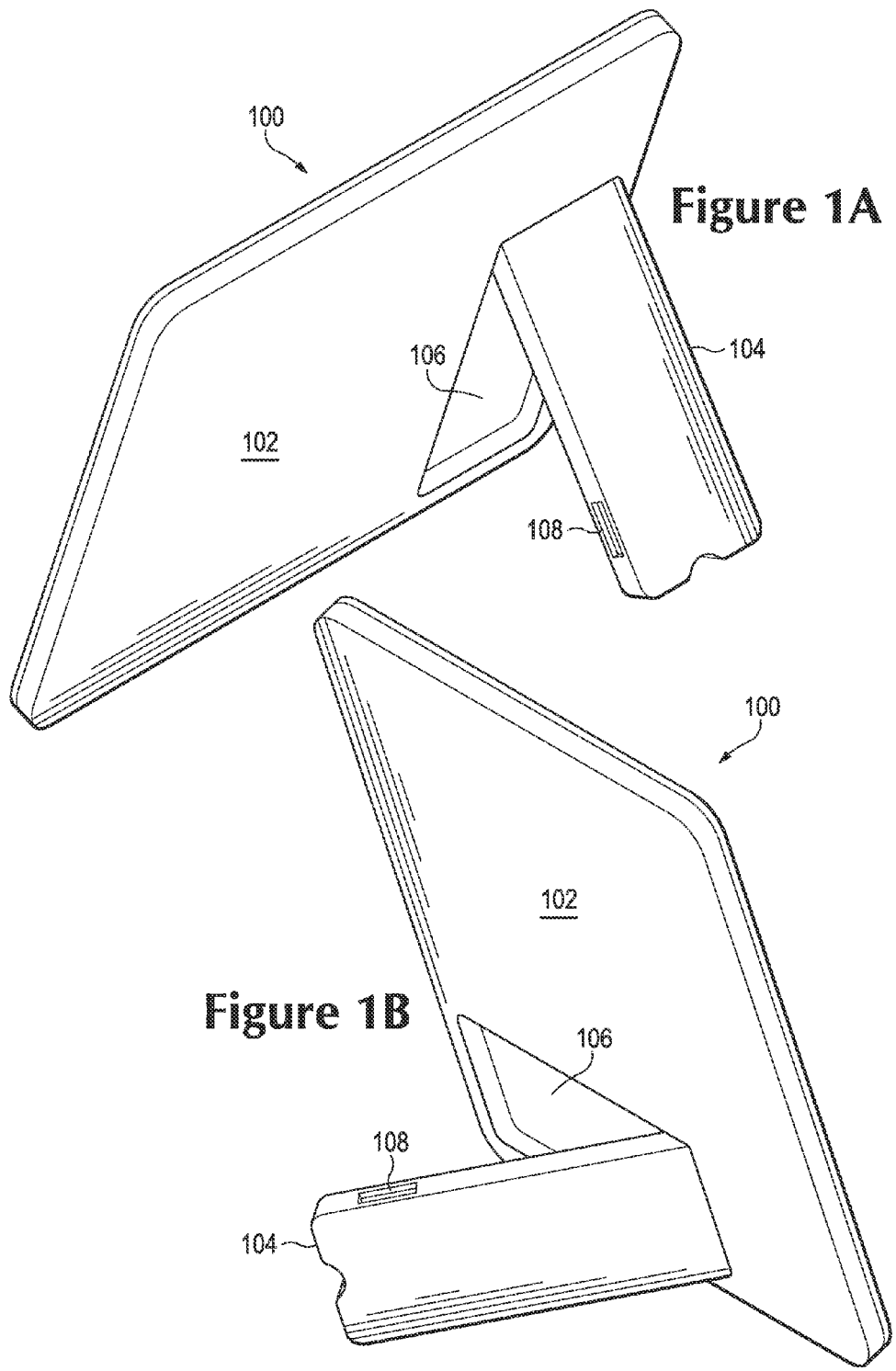
FIGS. 1A-1B illustrate perspective views of a tablet computing device in accordance with an example of the present disclosure.

Referring to FIG. 1, a computing device is illustrated in accordance with an example of the present disclosure. The computing device is illustrated as a tablet device, but the teachings herein are not so limited. Rather, it is expressly intended that the present disclosure may be utilized in conjunction with a plurality of computing devices, including but not limited to, slate computers, notebook computers, mobile phones, smart phones, notebook computers, and netbook computers among others. The computing device 100 may include a housing 102, a support member 104, and one or more ports 108, among other components.

The housing 102 may comprise a variety of materials and forms configured for use with various components, for example a touchscreen display and docking stations. The housing 102 may be fabricated in a plurality of manners. In one example, the housing is made of plastics formed via an injection molding process. In another example, the housing 102 is made of aluminum and may be formed via a milling process such as a computer numeric control (CNC) process. Other materials and form factors are contemplated. The housing 102 may include a recess 106. The recess 106 may be formed via the injection molding or CNC process. The recess 106 may be configured to house a support member 104.

In various examples, the support member 104 may be configured to support the computing device 100 at a desired angle, for example an angle other than horizontal. The support member 104 may be coupled to the housing 102 and is to support the housing 102 in a plurality of orientations while in an extended position and occupy the recess 106 in a stowed position. An orientation, as used herein, may be for example, either a portrait orientation or a landscape orientation. This will be discussed in more detail herein. Support member 104 may comprise a plurality of materials that may be similar to or different from the materials of the housing 102.

In a stowed position, the support member 104 may reside within recess 106. A surface of the support member 104 may form a portion of the surface of housing 102 such that the computing device 100 appears to have a substantially solid enclosure. In an extended position, the support member 104 may be angled away from the housing 102 such that it may support the housing 102. In the extended position, the support member 104 may provide access to a port, such as port 108.

Port 108 may be a port configured to enable attachment of a peripheral device or component. The port 108 may be any of a plurality of ports including but not limited to, a High Definition Multi-media (HDMI) port, a Secure Digital (SD) port, a Universal Serial Bus (USB) port, a printer port, a headphone/microphone jack, or another type of port. The port 108 may be accessible when the support member 104 supports the housing 102 in the plurality of orientations and may be inaccessible when the support member 102 is in the stowed position.

Referring to FIGS. 1A and 1B, the computing device 100 is illustrated in a first orientation and a second orientation, respectively. In the first orientation of FIG. 1A, the computing device is illustrated in a landscape orientation. A landscape orientation may coincide with a length of the display in a first axis and a width of the display in a second axis. In the second orientation of FIG. 1B, the computing device 100 is illustrated in a portrait orientation. A portrait orientation may coincide with the length of the display in the second axis and the width of the display in the first axis. In other words, the second orientation may be rotated ninety degrees with respect to the first orientation.

The support member 104 may be configured to support the housing 102 in the first orientation and the second orientation while in an extended position. An extended position, as used herein is any position capable of supporting the housing 102. As illustrated, a range of angles would enable the support member 104 to support the housing 102 and provide access to the port 108. Further, as illustrated, the port 108 is disposed on one side of the support member 104. The position of the port 108 enables a user or component access to the port regardless of the orientation of the housing 102. As illustrated in FIGS. 1A and 1B, port 108 remains accessible.

Figure 2:
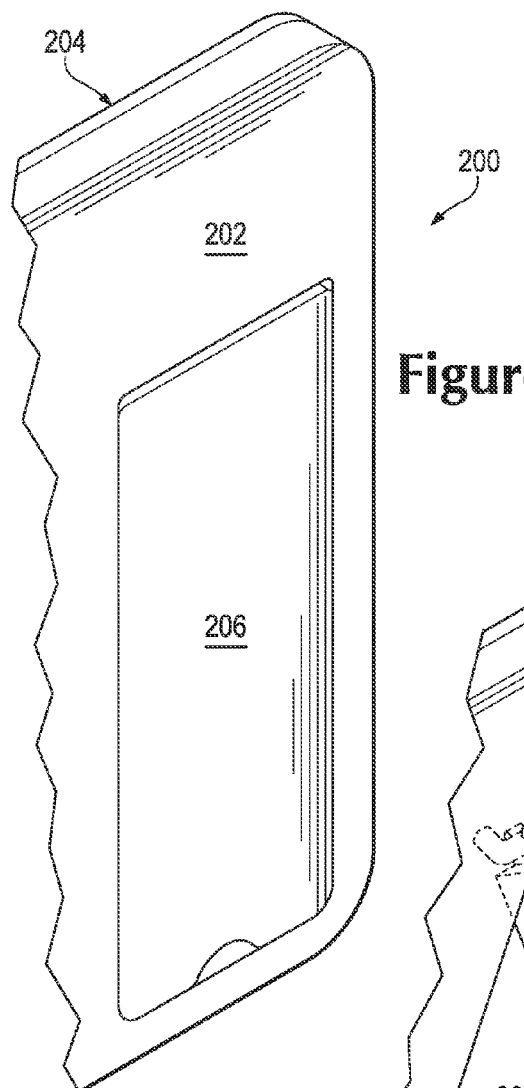
FIG. 2 illustrates a perspective view of a tablet computing device including support member in a closed position in accordance with an example of the present disclosure.

Referring to FIG. 2, another example of a computing device is illustrated in accordance with an example of the present disclosure. The computing device 200 includes a touch sensitive display 204 mounted within a housing 202, and a support member 206 coupled to the housing 202. The support member 206 includes a port (not illustrated) and is to support the touch sensitive display in a plurality of orientations while in an extended position and isolate the port in a stowed position.

Similar to the support member of FIGS. 1A-1B, the support member 206 may comprise a plurality of materials and shapes to support the housing in a variety of orientations. As illustrated, the support member 206 is in a stowed position. In the stowed position, the support member 206 occupies a recess within the housing 202 and effectively forms a portion of the housing 202, such that the housing 202 appears as a solid surface. While in the stowed position, a port of the support member 206 is isolated by the housing 202 and the support member 206. Isolated, as used herein, is defined as being inaccessible to a user. In the stowed position, the port may additionally be isolated from debris, dust, and other contaminants that could otherwise damage the port or components coupled thereto. In one example, while in a stowed position, the port may remain coupled to a device such as a wireless dongle, wireless communicator, or other device. This may enable, for example, association of a wireless mouse while the support member is in a stowed position.

Figure 3:
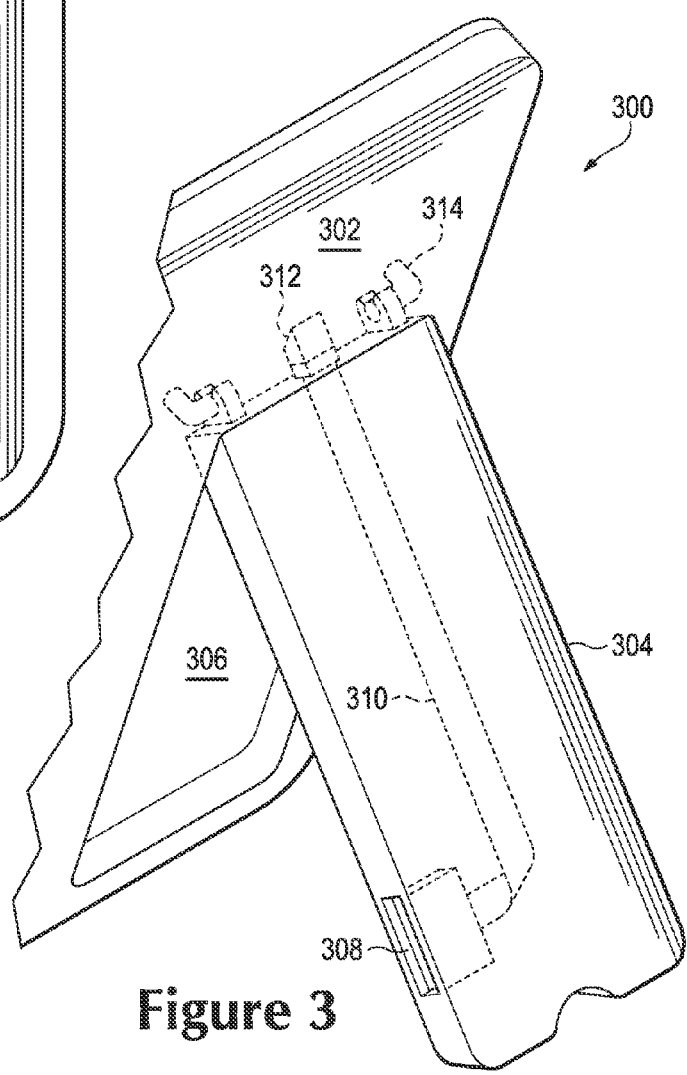
FIG. 3 illustrates a perspective view of a computing device in accordance with an example of the present disclosure.

FIG. 3 illustrates another example of a computing device in accordance with an example of the present disclosure. The computing device 300 includes a housing 302 comprising a recess 306 and a support member 304 comprising a port 308. The computing device 300 may be any device as described with reference to the preceding Figures. As illustrated, the support member 304 may be coupled to the housing 302 via a hinge 314. The hinge 314 may enable the support member 304 to rotate through various degrees of extension to enable support in variety of positions and orientations.

As illustrated, the support member includes a port 308. The port 308 may enable attachment of a peripheral device to the computing device 300 such that the peripheral device may interact with one or more components within the housing 302. As such, the port 308 may be electrically coupled to the one or more components within the housing 302. For example, the port 308 may be coupled to an electrical wire 310 that is routed to another component within the housing 302. The electrical wire 310 may be routed through one or more channels 312 located within or external to the hinge 314.

In one example, the port 308 is a USB 3.0 port that operates at approximately 5 Gbits/s. The port 308 may be coupled to one or more components within the housing 302 and may be accessible when the support member 304 is an extended position and inaccessible or isolated when the support member 304 is in a stowed position. Incorporating the port 308 into the support member 304 may serve to reduce interference generated by components within the housing 302, for example, antennas and wireless network cards. This may improve characteristics and usability of port 308. This reduction in interference may be increased by utilizing various types of material for the housing 302 and the support member 304, for example electrically isolating materials.

Figure 4:
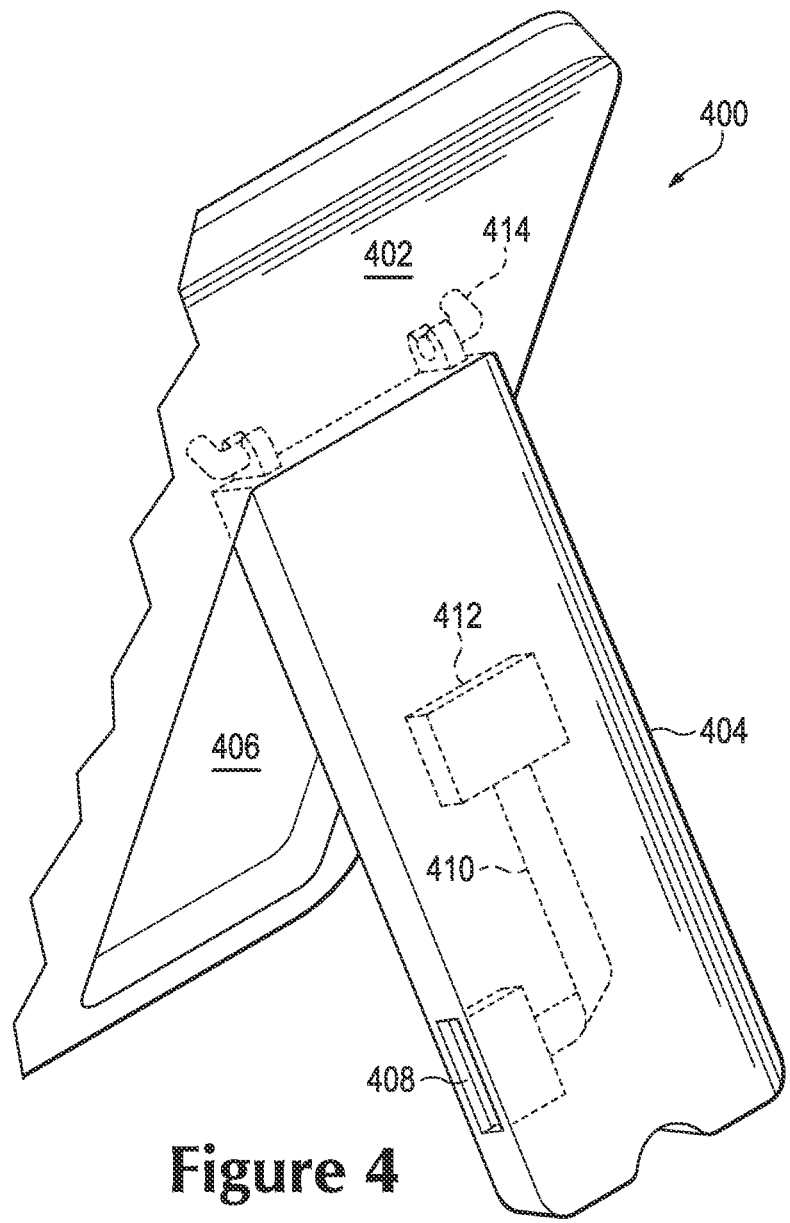
FIG. 4 illustrates another perspective view of a computing device in accordance with an example of the present disclosure.

Referring to FIG. 4, another example of a computing device is illustrated. Computing device 400 may be any computing device discussed with reference to the preceding Figures. Computing device 400 may include a housing 402 comprising a recess 406 and a support member 404 including a port 408. The support member 404 may be coupled to the housing 402 via a hinge 414.

In the illustrated example, the port 408 may be configured to communicate with a component within housing 402. To communicate, the port 408 may be coupled to a wireless component 412 such as, but not limited to, a Near Field Communication (NFC) component. The NFC component may be a high speed NFC component in various examples. The wireless component 412 may be wirelessly coupled to another component within housing 402 and enable communication from a device coupled to the port 408 to a corresponding component within housing 402.

In various examples, utilizing a wireless component 412 as a manner of coupling port 408 to a corresponding device within housing 402 may enable the housing 402 to be hermetically sealed. Hermetically sealing housing 402 may provide a water-tight environment and a more robust computing device 400.

Figure 5:
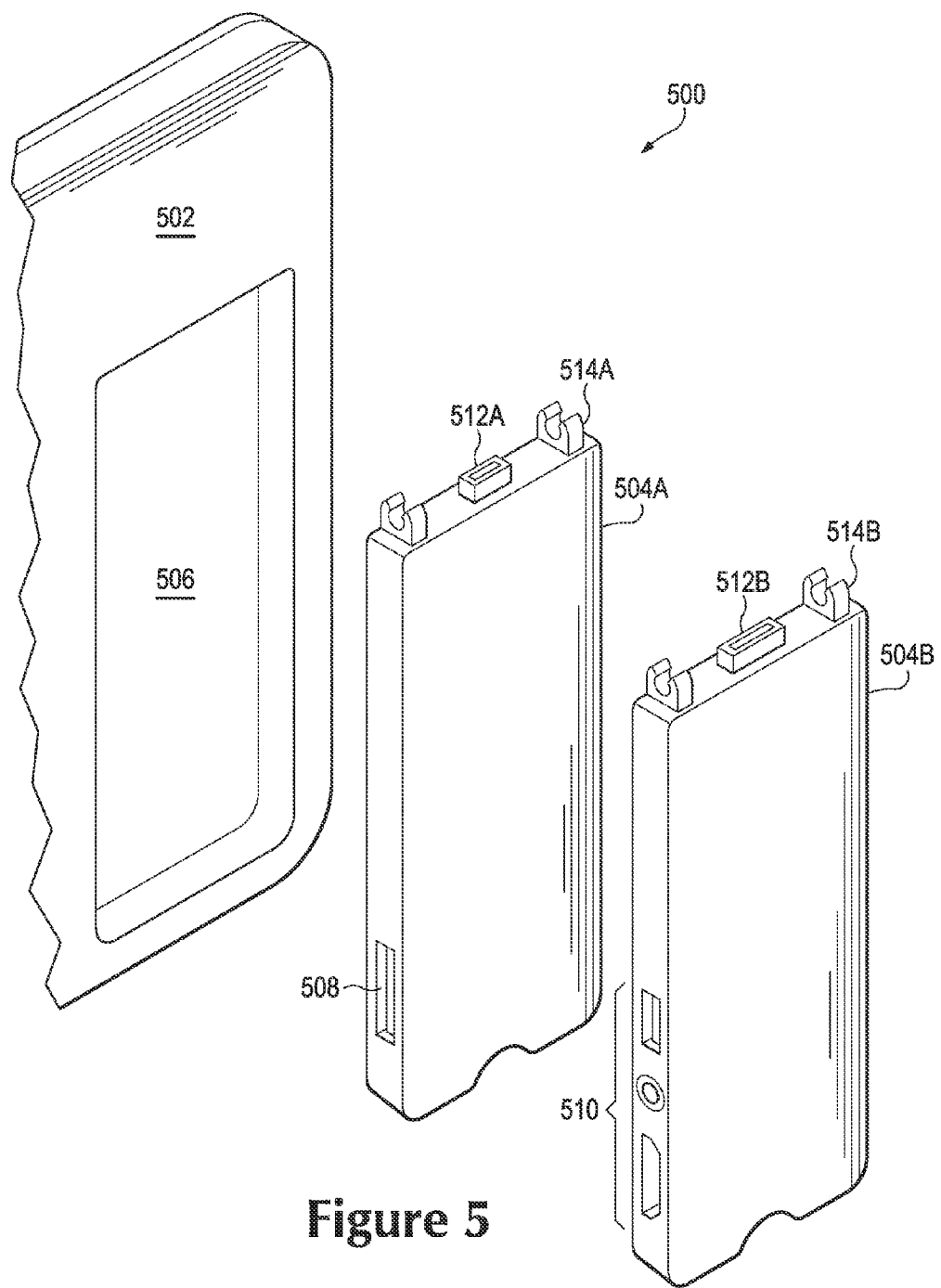
FIG. 5 illustrates a perspective view of a modular computing device in accordance with an example of the present disclosures.

Referring to FIG. 5, another computing device is illustrated in accordance with the present disclosure. The computing device 500 includes a housing 502 comprising a recess 506. The housing 502 is configured to couple to a plurality of support members illustrated as 504A and 504B. The various support members 504A, 504B may include one or more ports and/or various configurations of ports.

In the illustrated example, the housing 502 of computing device 500 may be configured to couple to a first support member 504A. The first support member 504A may be configured to move between an extended position and a stowed position. The support member 504A may include a port 508 which is to be accessible while the support member 504A is in an extended position and inaccessible or isolated while support member 504A is in a stowed position. The first support member 504A may also include a hinge 514A and a channel 512A, which enable the first support member 504A to couple to the housing 502 and route and electrical wire from the port 508 to a component internal to the housing 502.

The housing 502 of computing device 500 may also be configured to couple to a second support member 5043. Similar to the first support member 504A, the second support member 504B may be configured to move between an extended position and a stowed position. The support member 504B may include a plurality of ports 510 which are to be accessible while the support member 504B is in an extended position and inaccessible or isolated while support member 504B is in a stowed position. The support member 504B may include a hinge 514B and a channel 512B to route electrical wires from the plurality of ports 510 to one or more components within housing 502.

In the illustrated example, computing device 500 may be configured to utilize both the first support member 504A and the second support member 504B. This may enable interchangeability ports and associated functionality with the computing device 500. In one example, a first customer may utilize a computing device 500 with a first support member 504A providing access to a USB port 508, while a second customer may utilize a computing device 500 with a second support member 504B providing access to a SD port, a 3 mm port, and a HDMI port. The use of multiple support members 504A-B may allow greater customization of the computing device 500. Greater customization may enable cost savings, increased functionality, and accessibility to upgrades and future innovations.

Figure 6:
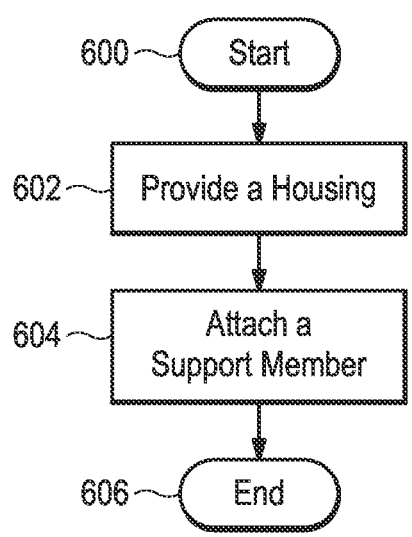
FIGS. 6-7 illustrate flow diagrams in accordance with examples of the present disclosure.
Figure 7:
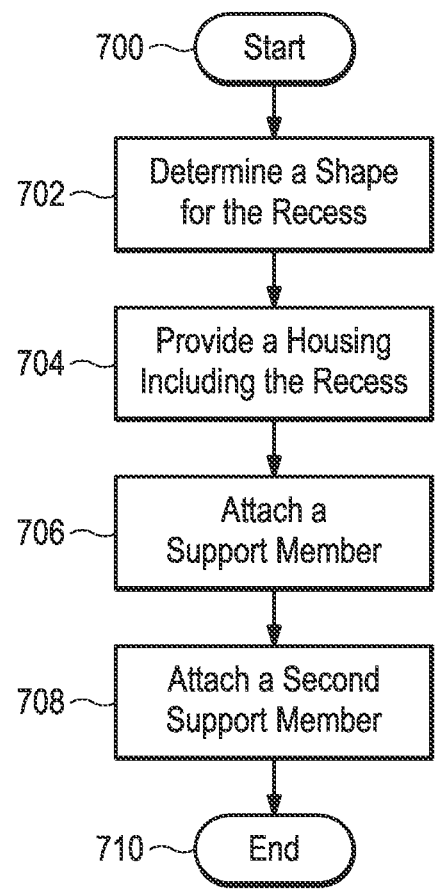

Referring to FIGS. 6-7 various flow diagrams are illustrated in accordance with the present disclosure. The flow diagrams illustrate elements in a particular order, but the order is not intended to limit the disclosure. Rather, it is expressly intended that the elements of the flow diagrams may occur in other orders. Additionally, the flow diagrams are not to be construed as requiring all the illustrated elements in all examples. Rather, those of ordinary skill will understand that variations may be utilized as defined by the claims.

Referring to FIG. 6, the flow diagram may begin at 602 where a housing for a tablet computing device may be provided. The housing may include a recess to stow a support member. The housing may be a housing as discussed with respect to the preceding figures.

The flow diagram may then progress to 604 where a support member may be attached to the housing. The support member may include a plurality of ports that are inaccessible while the support member is in the extended position and inaccessible while the support member is in a stowed position. In one example, attaching the support member may comprise utilizing a hinge to couple the support member to the housing and relying on a wireless device, such as an NFC device to communicate signals received via the port to the internal components of the housing. In another example, attaching the support member may comprise utilizing a hinge to couple to the support member to the housing and routing one or more electrical wires from the support member into the housing of the computing device. The method may then end.

Referring to FIG. 7, another flow diagram is illustrated. The flow diagram may begin at 702 where a shape for a recess may be determined. The shape of the recess may be determined such that a corresponding support member remains substantially hidden when in a stowed position. Once determined, a housing for a tablet computing device may be provided at 704. The housing may include the determined recess to stow a support member. The housing may be hermetically sealed around a display to provide an isolated environment to the components housed therein.

The flow diagram may then progress to 706 where a support member may be attached to the housing. The support member may include a plurality of ports that are inaccessible while the support member is in the extended position and inaccessible while the support member is in a stowed position. In this example, attaching the support member may comprise utilizing a hinge to couple the support member to the housing and relying on a wireless device, such as an NFC device to communicate signals received via the port to the internal components of the housing.

At 708, the process may continue where a second support member is attached to the housing, wherein the second support member includes at least one port that is not included on the first support member. In various examples, the second support member may also include a wireless device such as an NFC device to enable communication from the at least one port to a component within the housing. After attaching the second support member in the place of the first support member, the flow diagram may end Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. A tablet computing device, comprising:
a housing that includes a recess;
a support member coupled to the housing, wherein the support member is to support the housing in a plurality of orientations in an extended position and occupy the recess in a stowed position; and
a port disposed on the support member, wherein the port is accessible when the support member supports the housing in the plurality of orientations and is inaccessible in the stowed position,
wherein the support member includes a wireless component coupled to the port to facilitate communication between the port and another component in the housing.

2. The tablet computing device of claim 1, wherein the support member is coupled to the housing via a hinge.

3. The tablet computing device of claim 1, wherein the wireless component is a near field communication device to communicate with another component in the housing.

4. The tablet computing device of claim 1, wherein the support member comprises an isolating material to isolate the port from an electrical signal of another component within the housing.

5. The tablet computing device of claim 1, wherein the support member is substantially flush with a back side of the housing in a stowed position.

6. The tablet computing device of claim 1, wherein a first orientation of the plurality of orientations is a landscape orientation and a second orientation of the plurality of orientations is a portrait orientation.

7. The tablet computing device of claim 1, wherein the port is a universal serial bus ("USB") port.

8. The tablet computing device of claim 1, further comprising a second port, wherein the first port is a universal serial bus port and the second port is a secure digital ("SD") port.

9. A computing device, comprising:
a touch sensitive display mounted within a housing, wherein the touch sensitive display is capable of operation in a plurality of orientations; and
a support member coupled to the housing, wherein the support member includes a port and is to support the touch sensitive display in the plurality of orientations in an extended position and isolate the port while in a stowed position,
wherein the support member includes a wireless component coupled to the port to facilitate communication between the port and another component in the housing.

10. The computing device of claim 9, wherein the support member is coupled to the housing via a hinge.

11. The computing device of claim 9, wherein the support member is coupled to the housing via a hinge, and the wireless component is a near field communication device to communicate with another component in the housing.

12. The computing device of claim 9, wherein the support member is to support the touch sensitive display in a landscape orientation and a portrait orientation.

13. The computing device of claim 9, wherein the housing is hermetically sealed around the display and the port utilizes a near field communication protocol to communicate with a component within the housing.

14. The computing device of claim 9, where in the port is a universal serial bus port.

15. The computing device of claim 9, wherein the support member is interchangeable with one of a plurality of support members, and wherein the plurality of support members each comprise a different port configuration.

16. The computing device of claim 9, wherein the housing includes a recess conformed to the support member, such that when the support member is in the stowed position a surface of the support member is flush with a back surface of the housing.

17. A method comprising:
providing a housing for a tablet computing device, wherein the housing includes a recess to stow a support member; and
attaching the support member to the housing, wherein support member includes one or more ports that are accessible while the support member is in an extended position and are inaccessible in a stowed position,
wherein the support member includes a wireless component coupled to the port to facilitate communication between the port and another component in the housing.

18. The method of claim 17, further comprising:
removing the support member from the housing; and
attaching a second support member to the housing, wherein the second support member includes at least one port not included in the plurality of ports.

19. The method of claim 17, further comprising:
determining a shape for the recess, wherein the shape enables the support member to remain hidden from view in the stowed position.

20. The method of claim 17, wherein the wireless component is a near field communication device to communicate with another component in the housing.

* * * * *